April 4, 1972  D. I. LUSK  3,654,124
APPARATUS FOR ELECTROPHORETIC DEPOSITION
Filed Jan. 31, 1969  2 Sheets-Sheet 1
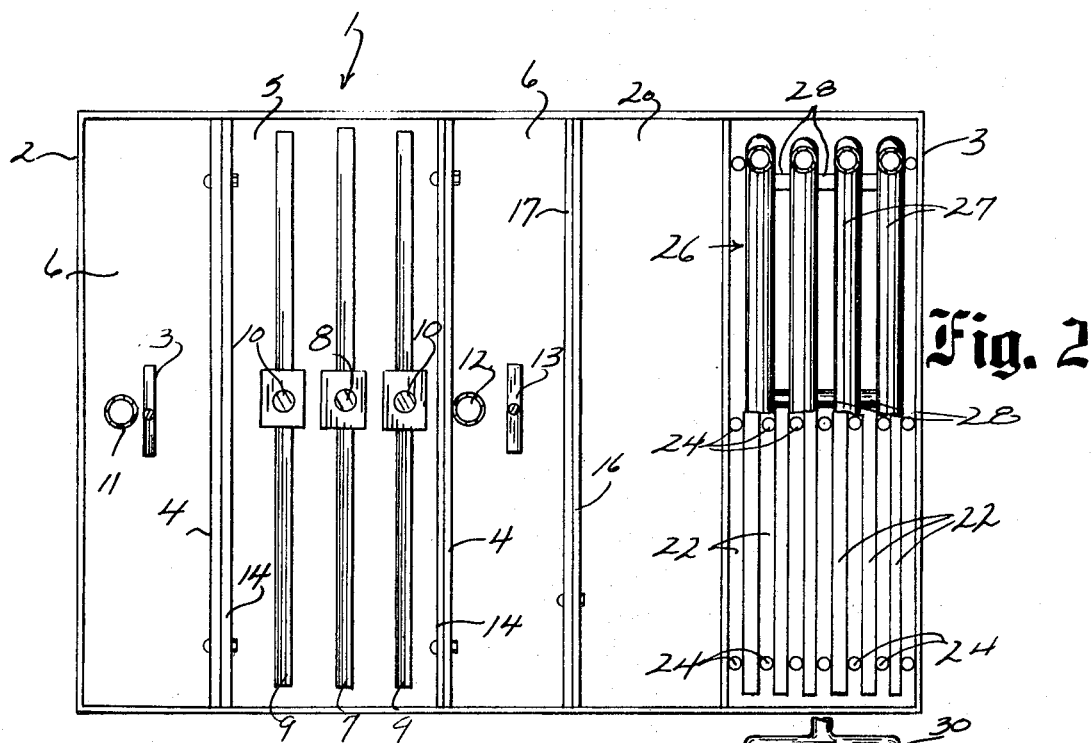
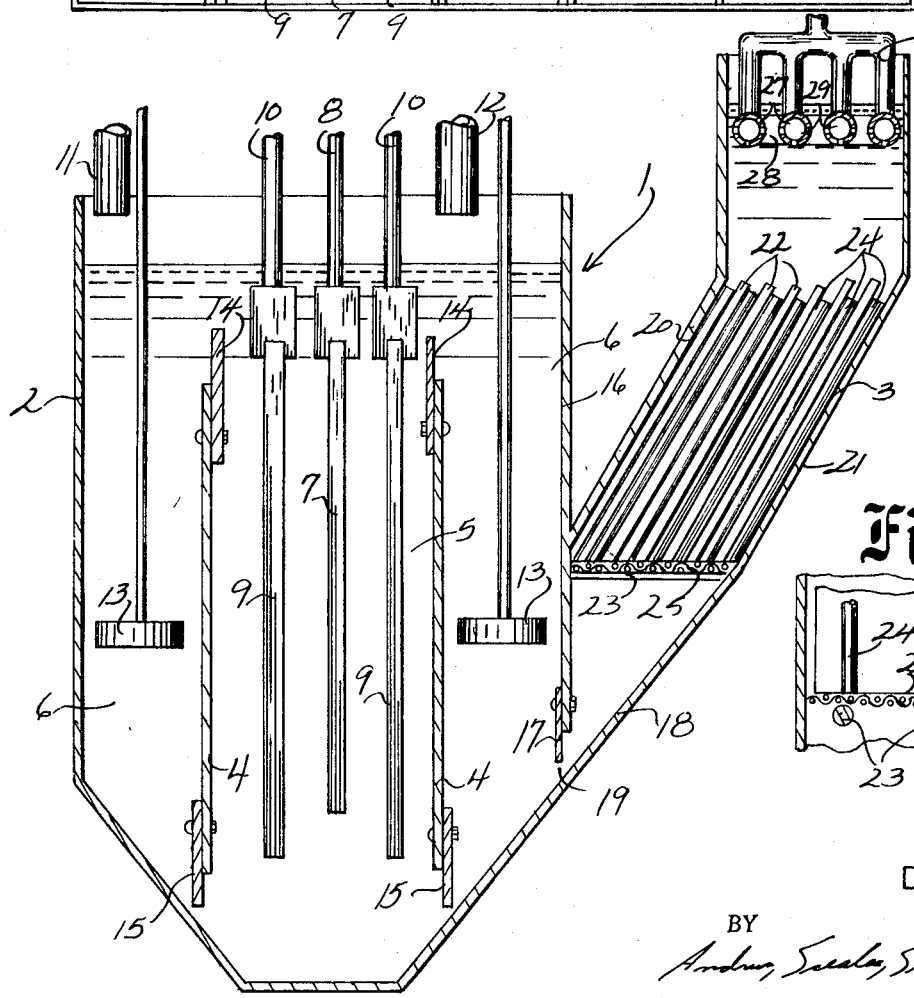
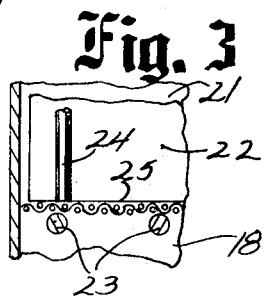
INVENTOR.
Donald I. Lusk
Attorneys

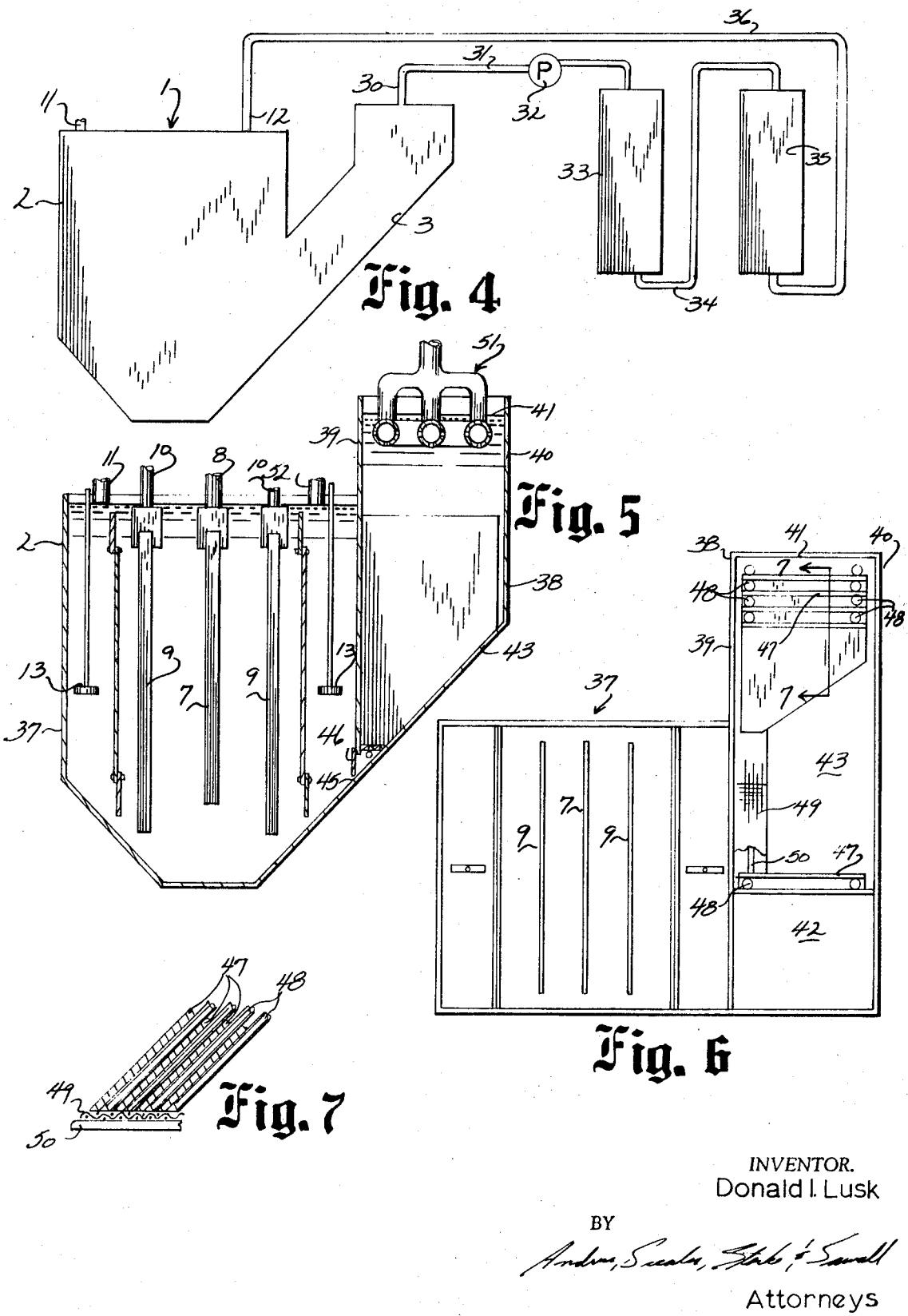

3,654,124
APPARATUS FOR ELECTROPHORETIC
DEPOSITION
Donald I. Lusk, Mequon, Wis., assignor to A. O. Smith
Corporation, Milwaukee, Wis.
Filed Jan. 31, 1969, Ser. No. 795,440
Int. Cl. B01k 5/02; C23b 13/00
U.S. Cl. 204—299                                    15 Claims

ABSTRACT OF THE DISCLOSURE

An apparatus for the electrophoretic deposition of glass including a casing which defines a deposition chamber and a settling chamber which communicates with the deposition chamber. The metal article to be coated is made an anode in an electrical circuit and is located in the deposition chamber along with a cathode. Glass slip, which is a water suspension of glass frit particles, clays and mill additions, is used to fill the deposition chamber and is added continuously to replace those solids removed during the coating operation. A voltage is applied across the circuit and the glass particles and clays are deposited on the metal workpiece.

In addition, a provision is made to continuously deionize the liquid or water phase of the glass slip. The glass frit particles settle out in the settling chamber on a series of spaced, generally parallel plates which are located at an angle of 50° to 90° with respect to the horizontal. Relatively glass-free liquid is withdrawn from the upper end of the settling chamber, passed through a series of ion exchange columns and the deionized liquid is returned to the deposition chamber, while the glass frit particles, which have settled out, flow downwardly from the settling chamber and are also returned to the deposition chamber.

---

This invention relates to an apparatus for the electrophoretic deposition of materials, such as glass.

Metals such as steel are frequently glass coated to improve the corrosion resistance. In the conventional procedure for glass coating, a glass slip, which is a water suspension of the glass frit particles and mill additions, is applied to the surface of the steel article. The slip is then dried and subsequently the coated steel article is fired at an elevated temperature to fuse the glass to the steel. In the glass coating process, the glass slip can be applied to the steel surface in any one of a number of methods, such as spraying, dipping, brushing or by the electrophoretic deposition of the glass particles. The electrophoretic deposition has advantages in that it results in a more effective use of the glass frit, there being substantially no waste, as compared with other common methods, such as spraying. In addition, electrophoretic deposition provides a more uniform coating of the glass on the base metal. With the conventional spraying method, a certain degree of overspraying is required to insure that all areas of the steel article are adequately coated with the glass slip.

In the electrophoretic deposition of glass, the metal article to be coated is made the anode in an electrical circuit and suspended in the glass slip along with a cathode plate. The glass particles are maintained in suspension by mildly agitating the slip. When a voltage is applied across the circuit, the glass frit particles and clays will tend to migrate to the anode and deposit in the form of a uniform coating on the metal.

Certain problems are inherent in the electrodeposition of glass particles from a water phase. Portions of the glass frit are soluble in the water and this results in a leaching of the frit, whereby the soluble constituents of the frit, such as sodium oxide, boric oxide and silicates, are dissolved in the water of the slip. This results in variations in the conductivity of the bath and in the rate of deposition, as well as a decrease in the quality of the coating. Therefore, it is desirable to remove the ions from the water phase of the slip so as to maintain a susbtantially uniform conductivity for the slip and to control the bath more effectively.

The ions or soluble constitutents can be eliminated from the slip by separating the water phase from the glass frit particles and discarding the water phase. However, this method is not desirable on a production basis because the discarding of large volumes of the water containing colloids and high levels of soluble materials presents a pollution problem and, secondly, the water phase contains other valuable constituents, such as gums, bentonite and the like, which, from an economic standpoint, should be recovered. The ionic contamination cannot be removed from the slip with conventional purification techniques because the slip contains such a high concentration of glass particles. The glass particles tend to clog the resin beds and inhibit flow through the beds, a swell as causing excessive abrasion and clogging in pumps and pipelines.

The present invention is directed to a process for the electrophoretic deposition of glass in which the glass frit particles are continuously separated from the water phase of the slip, and the water phase is then deionized and returned to the plating bath. After equilibration, this continuous decanting and purification cycle provides the bath with a substantially constant specific gravity and conductivity.

According to the invention, the apparatus includes a casing which defines a deposition chamber and a settling chamber. The bottom of the settling chamber communicates through an adjustable passage with the deposition chamber. The metal workpiece to be coated is made the anode in an electrical circuit and is located within the deposition chamber along with a cathode plate.

The deposition chamber is initially filled with glass slip and, as the coating operation proceeds, slip is continuously added to the chamber to replace the solids taken out by the coating operating. Mild agitation is provided for the slip to maintain the glass frit particles in suspension and, as the voltage is applied across the cathode and anode, the glass frit particles will be deposited on the metal anode or workpiece.

Because the glass frit particles are constantly being agitated with the water phase for long periods of time, soluble constituents of the glass will dissolve in the water phase of the slip and a provision must be made to continuously remove these ions from the water phase. In this connection, the water phase of the slip is first separated from the coarser glass particles and then deionized by use of an ion exchange unit. The first step of separation is accomplished in the settling chamber which includes a series of spaced, generally parallel plates, located at an angle of 50° to 90° with respect to the horizontal. As the slip flows between the plates, the glass frit particles tend to settle out on the plates, flow downwardly along the plates, and then through the passage to return to the deposiion chamber. The water phase, which is now relatively glass-free, although still containing some suspended colloids, is continuously withdrawn from the upper end of the settling chamber and is passed through a series of one or more fixed bed ion exchange units where the ions are removed. The deionized water phase is then returned to the deposition chamber.

Although the settling tank effluent is substantially completely deinoized, the conductivity level in the deposition bath is maintained at a moderate level where no appreciable quality decrease occurs in the coating. In this way, only a sufficient quantity of the water phase must be purified to offset an increase in ionization over the desired moderate level by natural leaching of the frit and by the addition of fresh slip to the deposition chamber. Thus, whenever increased ionization appears, the entire bath need not be purified and this greatly reduces the separation requirements.

By removing the glass frit particles from the water phase of the slip before the water phase is conveyed to the ion exchange column, the pumping requirements are substantially simplified, and clogging of the pumping equipment and ion exchange column is eliminated.

Other objects and advantages will appear in the course of the following description.

The drawings illustrate the best mode presently contemplated for carrying out the invention.

In the drawings:

FIG. 1 is a vertical section of the apparatus for the electrophoretic deposition of glass;

FIG. 2 is a plan view of the apparatus shown in FIG. 1 with parts broken away in section;

FIG. 3 is an enlarged vertical section showing the manner of supporting the settling plates;

FIG. 4 is a diagrammatic representation of the electrophoretic deposition apparatus associated with an ion exchange system;

FIG. 5 is a vertical section of a modified form of the electrophoretic deposition apparatus;

FIG. 6 is a top view of the apparatus of FIG. 5; and

FIG. 7 is a section taken along line 7—7 of FIG. 6.

FIGS. 1–4 illustrate an apparatus for the electrophoretic deposition of glass or other similar materials. The apparatus includes a housing 1 which defines a deposition tank 2 and a settling tank 3. The deposition tank 2 and settling tank 3 are mounted in a side-by-side relation and the lower end of the settling tank communicates with the deposition tank.

A pair of walls 4 extend the length of the deposition tank 2 and divided the tank into a central chamber 5 and a pair of side chambers 6. The metal workpiece 7 to be coated is suspended within the central chamber 5 by an electrically conductive support 8, and a pair of cathode plates 9 are located on either side of the workpiece 7 and are similarly supported within the central chamber by electrically conductive supports 10.

The glass slip, which is a water suspension of finely divided glass frit particles and mill additions, is introduced into the deposition tank 2 through an inlet 11. During the deposition process the water soluble components of the glass frit, and particularly sodium oxide, and to some extent boric oxide and silicates, will tend to dissolve in the water phase of the slip, with the result that the conductivity of the slip will be progressively increased. According to the invention, a provision is made to initially remove the suspended glass frit particles from the water phase of the slip and then deionize the water phase, with the deionized water being returned to the deposition tank 2 through the conduit 12.

To maintain the glass frit in suspension in the deposition tank, the slip is mildly agitated by a pair of agitators 13 which are located within the side chambers 6. The agitators 13 provide a gentle agitation for the bath or slip to prevent the glass frit particles from settling out. To adjust the flow of the slip between the side chambers 6 and the central chamber 5, an upper adjustable gate 14 is associated with the upper edge of each of the walls 4. The gates 14 can be moved vertically with respect to the walls 4 to thereby vary the effective height of the walls and control the flow of the slip from the central chamber 5 to the side chambers 6. Similarly, an adjustable lower gate 15 is connected to the lower edge of each of the walls 4 and, by adjustment of the gates 15, the flow of the slip from each side chamber 6 to the central chamber can be regulated. With this construction, the agitators 13, in combination with the adjustable gates 14 and 15, provide a gentle flow of the slip within the deposition tank 2 to maintain the glass frit particles in suspension in the slip.

As shown in FIG. 1, the side wall 16 of the deposition tank 2 carries an adjustable gate 17, similar to gates 14 and 15, and the lower edge of the gate 17 is spaced from the diagonal wall 18 to provide a passage or slot 19 between the members. The passage 19 provides communication between the deposition tank 2 and the settling tank 3.

The settling tank 3 includes a pair of parallel sloping side walls 20 and 21 and side wall 21 acts as a continuation of the diagonal wall 18 of the deposition tank 2. To promote settling of the glass frit particles within the settling tank 3, a series of generally flat plates 22 are located in spaced, parallel relation within the settling tank. As shown in FIG. 1, the plates are disposed at an angle of 50° to 90° with respect to the horizontal and preferably at an angle of about 60°. The plates are formed of a relatively smooth, non-corrodable material, such as glass coated steel, stainless steel, plastic or the like.

While the drawings show the plates 22 as being flat, the plates can be curved or have any desired shape or configuration as long as they do not contain obstructions which would hamper the downward flow of the particles along the plates. Moreover, other elements, such as tubes, channels, or the like, can be substituted for the plates 22 and function in the same manner as settling surfaces for the frit particles.

As the settling tank 3 is connected to the deposition tank 2 by means of the passage 19, the glass slip will substantially fill the settling tank. However, the slip within the settling tank is in a relatively quiescent state, so that the frit particles will tend to settle out on the plates 22. The plates 22 act to increase the area over which effective settling can occur by preventing the settled glass frit particles in one level from contaminating the levels beneath.

The plates 22 are supported on a series of spaced parallel rods 23 which extend between the wall 16 and the wall 18. To space the plates 22 apart, a series of hollow tubes 24, made of plastic or the like, are located in the spaces between adjacent plates 22. The tubes 24 act to space the plates 22 apart, and as the tubes are hollow, the slip can move freely within the tubes.

To prevent the tubes 24 from falling downwardly within the settling tank, a screen 25 or other member of open construction is positioned across the rods 23 and the lower ends of the tubes 24 are supported on the screen.

With this construction, the glass frit particles of the slip in the spaces between adjacent plates will settle downwardly onto each plate 22 and will then slide by gravity downwardly along the various plates. The frit particles will then fall from the lower ends of plates 22 onto the diagonal wall 18 and will slide along the wall 18 and through the passage 19 to the deposition tank 2 where the gentle agitation provided by the agitators 13 will again act to suspend the glass frit particles in the slip.

As the glass frit particles settle out on the plates 22, the liquid or water phase located in the settling tank 3 above the level of the plates 22, will contain a minimum or reduced amount of suspended frit particles. Generally the water phase above the level of plates 22 in settling tank 3 will contain less than 5% by weight of suspended glass frit solids, and normally about 1%. However, the water phase contains ions from the soluble constituents of the glass frit, as well as water soluble gums and colloidally suspended material, such as bentonite, from the mill addition. The water phase is pumped from the upper end of the settling tank 3 and passed through an ion exchange system to remove the ions and the deionized water phase is then returned to the deposition tank 2 through the inlet 12.

To withdraw the water phase from the top of the settling tank 3, a floating manifold assembly 26 is employed. The assembly 26 includes a series of parallel pipes 27 which float on the surface of the liquid and pipes 27 are connected by cross pipes 28 filled with air to float the assembly. The pipes 27 are provided with a plurality of holes 29 and the water passes through the holes and into the pipes 27. A manifold tube 30 is connected to the pipes 27 and the manifold tube in turn is connected to the suction side of a pump. When the pump is operated, the water will be drawn from the entire upper liquid level in the settling tank 3, through the pipes 27 and manifold tube 30 to the pump and then delivered to the ion exchange system.

Because of the density difference between the liquid in the deposition tank 2 and the settling tank, the levels in these two tanks will be different. Also, the liquid level in the settling tank will vary depending on the rate of withdrawal of the liquid, and the liquid level will also vary during periods of non-use, such as weekends and between shifts. For example, over a weekend, a greater proportion of glass particles will settle out on the plates 22, making the liquid phase less dense and increasing the liquid level height in the settling chamber. Thus, the manifold assembly, by floating on the liquid surface, automatically adjusts to these variations in liquid level.

In operation of the apparatus of the invention, the workpiece is suspended within the deposition tank 2 and the glass slip is introduced into the tank through the inlet 11. The slip within the tank 2 will flow through the passage 19 and into the settling tank 3 where the glass frit particles will settle out on the plates 22. As the specific gravity of the liquid within the settling tank 3 is less than the specific gravity of the slip within the deposition tank 2 due to the settling out of the heavier frit particles, the liquid level on the tank 3 will be above the liquid level in the tank 2. As the pump 32 is operated, the liquid will be continuously drawn through the manifold assembly 26 and passed through the ion exchange columns 33 and 35 where the dissolved impurities from the glass are removed, and the deionized liquid is then returned to the deposition tank through the conduit 12. The addition of the slip through line 11 as well as the return of the deionized water phase to the bath through conduit 12, are correlated with the rate of glass deposition so that a substantially uniform specific gravity of approximately 1.3, is maintained in the tank. As the voltage is applied to the electric circuit, particles of glass frit and clay are deposited in the form of a uniform coating on the workpiece 7. As previously mentioned, the specific gravity of the water phase in the upper end of the settling tank 3 will be less than the specific gravity of the slip in tank 2 due to the settling out of the glass frit particles. Generally, the specific gravity of the water phase in the tank 3 will be less than 1.1 and preferably below 1.05. With a specific gravity in this range, the water phase can be readily pumped to the ion exchange system without adversely affecting either the operation of the pumping equipment or the ion exchange column. The soluble gums in the water phase will not be removed in the ion exchange column and only a minor portion of the suspended materials, such as clay, will be filtered out of the water phase in the ion exchange columns, so that these constituents are not lost, but remain in the system.

FIG. 4 is a diagrammatic view showing the deposition apparatus in conjunction with the ion exchange system. As shown in FIG. 4, a conduit 31 is connected to manifold tube 30 of floating manifold assembly 26 and conduit 31 is connected to the suction side of a pump 32. The discharge of the pump 32 is connected to the upper end of an ion exchange column 33, while a conduit 34 connects the lower end of column 33 with the upper end of a second ion exchange column 35. The lower end of column 35 is connected by conduit 36 to the conduit 12 so that the deionized water phase can be returned to the deposition tank.

While the ion exchange system may include a single bed of mixed cation-anion resins, regeneration of a mixed system is rather complicated so it is preferred to use separate cation and anion beds, as shown in FIG. 4. The bed 33 contains a conventional strong-base cation resin, such as sulfonated styrene divinyl benzene polymerizate, an example of which is sold under the trade name IR–120 by Rohm & Haas Co. The ion exchange column 35 contains a conventional strong-base anion exchange resin, such as styrene divinyl benzene polymer which contains quaternary ammonium groups, such as that sold under the trade name IRA–400 by Rohm & Haas Co.

The positive ions are removed from the water phase in the column 33 with a resilting drop in the pH, and the anion exchange resin in column 35 removes the negative ions and restores a substantially neutral pH to the water phase being discharged from column 35 through conduit 36.

Even though the water phase contains colloidally suspended materials, such as clay, it has been found that only a very minor portion of the colloidally suspended material is deposited on the ion exchange resins in the columns 33 and 35 so that the water phase being discharged to the deposition tank retains the clays and water soluble gums which were added in the mill addition.

It has been found that strong-base ion exchange resins are preferred over weak-base resins because the weak-base resins will not completely remove the ionized materials. For example, weak-base resins will not completely remove partially ionized materials such as silicates and borates. By using strong-base ion exchange resins the concentrations of all ions in the water phase are reduced to very low levels so that the water phase being returned to the deposition tank will be substantially free of ions.

It has been found that the size of the resin particles used in the ion exchange columns 33 and 35 is important. Resin particles with a size of 16 to 30 mesh, based on standard U.S. sieve sizes, tend to permit higher flows through the beds and cause less filtering action and loss of colloidal materials than beds containing resins of smaller mesh sizes.

FIGS 5–7 illustrate a modified form of the invention which includes a deposition tank 37 and a settling tank 38 which communicates with the deposition tank. The deposition tank 37 can be similar in construction to that shown in FIGS. 1–4. The settling tank includes a pair of side walls 39 and 40, and the side wall 39 also constitutes a wall of the deposition tank 37. The ends of the side walls 39 and 40 are enclosed by a pair of generally parallel diagonal walls 41 and 42. Due to the diagonal configuration of the end walls 41 and 42, the bottom of the settling tank is co-extensive with the deposition tank 37, while the upper end of the settling tank 38 is offset from the upper end of the deposition tank as shown best in FIG. 5.

The lower end of the settling tank is enclosed by a diagonal deflection wall 43, which, as in the case of the first embodiment, forms an extension of the diagonal wall 44 of the deposition tank. Communication is established between the settling tank 38 and the deposition tank 37 through a passage 45, similar to passage 19, and the size of the passage can be adjusted by means of the adjustable gate 46, similar to gate 17 of the first embodiment.

Located within the settling tank are a series of settling plates 47, and plates 47 are located parallel to the walls 41 and 42. As in the first embodiment, the plates are spaced apart by tubes 48 and the tubes are retained on a screen 49 which extends across the bottom of the settling chamber and rests on rods 50.

As in the previous embodiment, the water phase is withdrawn from the settling tank through a manifold assembly 51, similar to manifold assembly 26, and is pumped to an ion exchange system. As previously described, the deionized water phase is then returned to the deposition chamber through the conduit 52.

The present invention serves to continuously remove the dissolved ions from the water phase of the slip, while not removing the valuable gums and clays from the water phase. By returning the deionized water to the deposition tank and continually adding fresh slip, a substantially constant specific gravity is obtained resulting in more precise and effective current control.

While the description has been directed to the electrophoretic deposition of glass frit, it is contemplated that the invention can be used for the electrophoretic deposition of any electrically insulating material having a component which is soluble in the plating bath.

Various modes of carrying out the invention are contemplated as being within the scope of the following claims particularly pointing out and distinctly claiming the subject matter which is regarded as the invention.

I claim:

1. In an apparatus for the electrophoretic deposition of materials, a deposition tank adapted to contain a suspension of particles in a liquid and adapted to have a workpiece to be plated disposed within the liquid in the deposition tank, a cathode disposed within the deposition tank and connected in an electrical circuit, means for making the workpiece the anode in said electrical circuit, agitating means disposed in said deposition tank for maintaining the particles in suspension in the liquid, a settling tank, passage means for providing communication between the bottom portion of said settling tank and said deposition tank, and conveying means for conveying particles which settle out in said settling tank through said passage means to the deposition tank.

2. The apparatus of claim 1, wherein said particles are adapted to include an ionizable component soluble in said liquid and said liquid contains ions of said component, said apparatus includes a deionizing unit, means for withdrawing liquid having a reduced concentration of suspended particles from the upper end of the settling tank and delivering said liquid to said deionizing unit to remove the ions from said liquid, and means for returning substantially deionized liquid to said deposition tank.

3. The apparatus of claim 4, wherein said means for withdrawing liquid is located above said settling elements.

4. The apparatus of claim 1, and including a series of settling elements located within said settling tank, each of said elements having a settling surface located at an angle of 50° to 90° with respect to the horizontal and arranged so that particles settling on said surface will be directed to said conveying means.

5. The apparatus of claim 4, wherein said settling elements comprise a series of generally parallel spaced plates.

6. The apparatus of claim 1, wherein said conveying means comprises an inclined surface located at the bottom of said settling tank and extending upwardly from said passage means.

7. The apparatus of claim 5, and including support means disposed within said settling tank for supporting said plates within the tank, and spacing means for spacing said plates apart.

8. The apparatus of claim 7, wherein said spacing means comprises a series of hollow tubes.

9. The apparatus of claim 1, and including means for adjusting the effective size of said passage means to thereby control the flow between said deposition tank and said settling tank.

10. The apparatus of claim 1, and including agitating means disposed within said deposition tank for agitating said suspension and maintaining said particles in suspension.

11. In an apparatus for the electrophoretic deposition of particles suspended in a liquid, a deposition tank adapted to contain a liquid having particles suspended therein, said particles containing an ionizable constituent soluble in said liquid, said tank adapted to contain a metal workpiece, a cathode disposed in said deposition tank and connected in an electrical circuit, means for making the workpiece the anode in said electrical circuit, a settling tank having a downwardly sloping surface, passage means providing communication between the bottom portion of the settling tank and the deposition tank with said sloping surface extending upwardly from said passage means whereby particles settling from said liquid will move downwardly along said sloping surface and through said passage means to the deposition tank, a series of settling elements located within the settling tank with each element having a settling surface disposed at an angle of 50° to 90° with respect to the horizontal, said particles settling out on said settling surfaces and sliding downwardly therefrom onto said sloping surface, a deionizing apparatus, liquid withdrawal means located above the level of the elements and connected to said settling tank for withdrawing liquid from the upper end of said settling tank and passing said liquid through said deionizing apparatus to remove the ionized constituent from the liquid, and means for returning deionized liquid from the deionizing apparatus to the deposition tank.

12. The apparatus of claim 11, wherein said elements comprise a series of spaced generally parallel plates.

13. In an apparatus for the electrophoretic deposition of glass, a deposition tank adapted to contain a suspension of glass frit particles in a water base slip and adapted to have a workpiece to be plated disposed within the deposition tank, a cathode disposed within the tank and connected in an electrical circuit, means for making the workpiece the anode in said electrical circuit, agitating means disposed within said tank for maintaining the particles in suspension in the slip, a settling tank, passage means for providing communication between the lower portion of said settling tank and said deposition tank, and a series of settling elements located within said settling tank, each of said elements having a generally flat settling surface disposed at an acute angle with respect to the horizontal and arranged so that particles settling on said surfaces will be directed through said passage means to the deposition tank.

14. The apparatus of claim 13, wherein said settling elements comprise a series of spaced generally parallel plates.

15. The apparatus of claim 2, wherein said deionizing unit includes a pair of ion exchange resin columns disposed in series, the first column of said series containing a strong base cation resin and the second column of said series containing a strong base anion resin.

References Cited

UNITED STATES PATENTS 3,461,060   8/1969   Nellen _____ 204—180

FOREIGN PATENTS 1,033,833   6/1966   Great Britain _____ 204—181

JOHN H. MACK, Primary Examiner
A. C. PRESCOTT, Assistant Examiner

U.S. Cl. X.R.
204—300, 181